United States Patent
Pearcy et al.

(10) Patent No.: US 8,839,349 B2
(45) Date of Patent: Sep. 16, 2014

(54) INTEGRATING SECURITY POLICY AND EVENT MANAGEMENT

(75) Inventors: Derek Patton Pearcy, San Francisco, CA (US); Jessica Anne Heinrich, Tacoma, WA (US); Jessica Jeanne Gaskins, Boulder Creek, CA (US); Craig Anthony Phillips, Swindon (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/340,597

(22) Filed: Dec. 29, 2011

(65) Prior Publication Data

US 2013/0097662 A1    Apr. 18, 2013

Related U.S. Application Data

(60) Provisional application No. 61/548,456, filed on Oct. 18, 2011.

(51) Int. Cl.
| | | |
|---|---|---|
| G06F 17/00 | (2006.01) | |
| H04L 29/06 | (2006.01) | |
| G06F 21/57 | (2013.01) | |

(52) U.S. Cl.
CPC .................................. *G06F 21/577* (2013.01)
USPC ........................................................... 726/1

(58) Field of Classification Search
CPC ...... G06F 21/50; G06F 21/70; G06F 2221/03
USPC ........................................................... 726/1
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,530,024 B1 | 3/2003 | Proctor | |
| 7,246,370 B2 | 7/2007 | Valente et al. | |
| 7,451,488 B2 | 11/2008 | Cooper et al. | |
| 7,478,424 B2 * | 1/2009 | Mester et al. | 726/11 |

(Continued)

FOREIGN PATENT DOCUMENTS

WO    WO 2013/059520 A1    4/2013

OTHER PUBLICATIONS

International Search Report and Written Opinion, International Application No. PCT/US2012/060907, mailed Feb. 13, 2013, 9 pages.

(Continued)

*Primary Examiner* — Dant Shaifer Harriman
(74) *Attorney, Agent, or Firm* — Patent Capital Group

(57) ABSTRACT

A plurality of security events is detected in a computing system, each security event based on at least one policy in a plurality of security policies. Respective interactive graphical representations are presented in a graphical user interface (GUI) of either or both of the security events or security policies. The representations include interactive graphical elements representing the respective security events or security policies. User selection of a particular event element via the interactive GUI causes a subset of the security policies to be identified, each security policy in the subset serving as a basis for at least one particular security event represented by the particular event element. User selection of a particular policy element via the interactive GUI causes a subset of the security policies to be identified, each security event in the subset based at least in part on a particular security policy represented by the particular policy element.

21 Claims, 12 Drawing Sheets

(56) References Cited

U.S. PATENT DOCUMENTS

| | | | |
|---|---|---|---|
| 7,506,155 B1 | 3/2009 | Stewart et al. | |
| 7,583,187 B1* | 9/2009 | Cheng et al. | 340/506 |
| 8,074,256 B2 | 12/2011 | Valente et al. | |
| 2004/0117624 A1 | 6/2004 | Brandt et al. | |
| 2007/0022470 A1 | 1/2007 | Yang | |
| 2007/0168452 A1* | 7/2007 | Winter | 709/213 |
| 2008/0066151 A1 | 3/2008 | Thomsen et al. | |
| 2008/0109870 A1 | 5/2008 | Sherlock et al. | |
| 2008/0148350 A1* | 6/2008 | Hawkins et al. | 726/2 |
| 2010/0067390 A1 | 3/2010 | Pereira Valente et al. | |
| 2010/0257576 A1 | 10/2010 | Valente et al. | |
| 2011/0154255 A1* | 6/2011 | Ryu et al. | 715/810 |
| 2011/0225622 A1 | 9/2011 | Pearcy et al. | |

OTHER PUBLICATIONS

Sloman, M. et al., Security and Management Policy Specification, IEEE Network, vol. 16, Issue 2, pp. 10-19, Mar./Apr. 2002 (10 pages).

Information Technology Risk Management, Copyright 2002, © Glen B. Alleman, Niwor, Colorado, 22 pages.

International Preliminary Report on Patentability in International Application No. PCT/US2012/060907, mailed Apr. 22, 2014, 5 pages.

\* cited by examiner

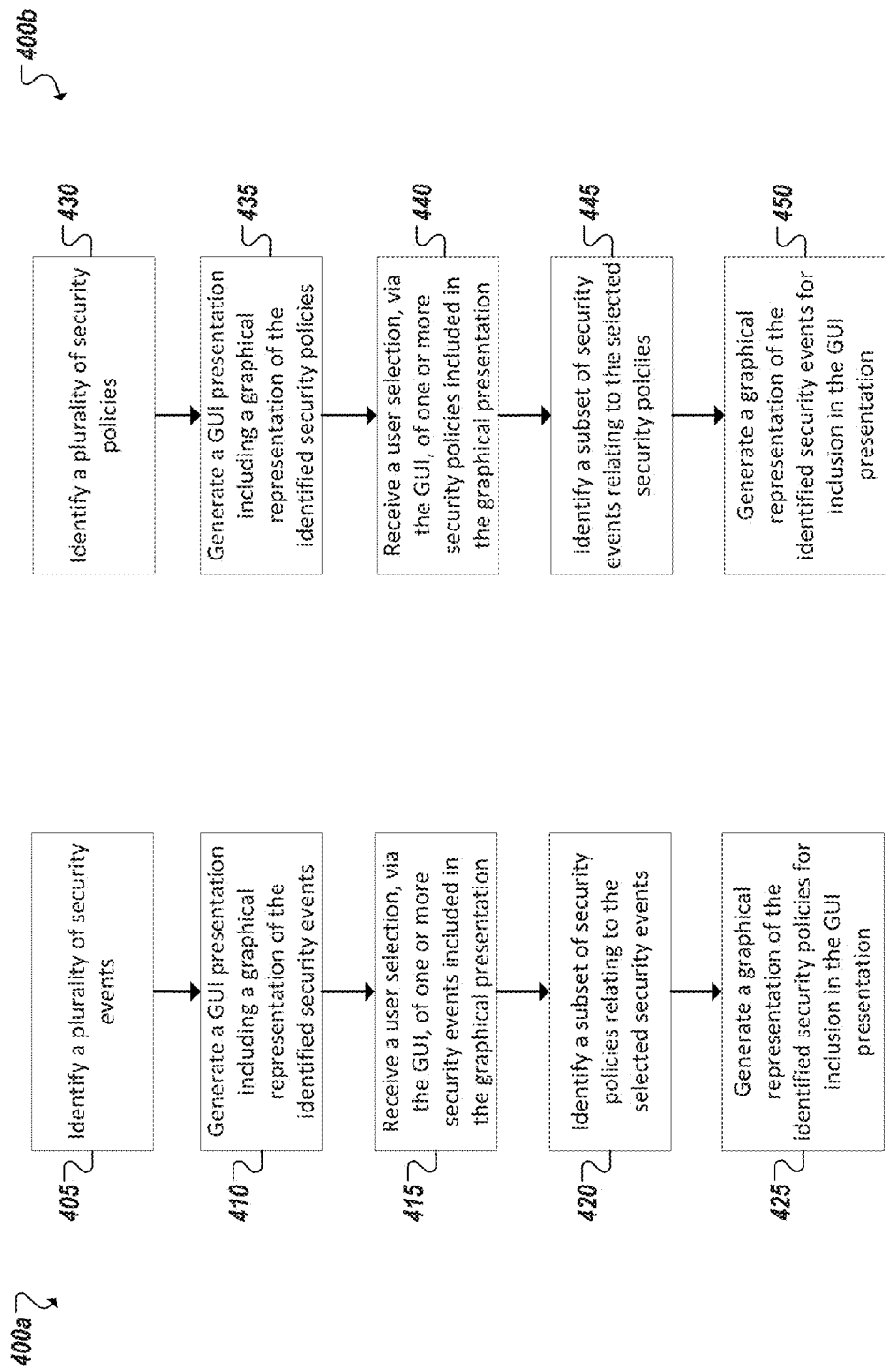

INTEGRATING SECURITY POLICY AND EVENT MANAGEMENT

This patent application claims the benefit of priority under 35 U.S.C. §120 of U.S. Provisional Patent Application Ser. No. 61/548,456, filed Oct. 18, 2011, entitled "INTEGRATING SECURITY POLICY AND EVENT MANAGEMENT", which is expressly incorporated herein by reference in its entirety.

TECHNICAL FIELD

This disclosure relates in general to the field of data analytics and, more particularly, to graphical user interfaces in data analytics software.

BACKGROUND

Computer security tools have been deployed throughout the world to assist in protecting computing systems, devices, and resources from various threats, vulnerabilities, and risks. The evolution of malware, viruses, worms, system vulnerabilities, hacks, and threats continues to keep pace with the advances in computing. Accordingly, demand for robust and sophisticated security tools to counteract such threats has also increased. Given the increasing complexity of such tools and the increasing degree to which administrators can customize their security tools to deal with specific threats, including threats unique to particular devices, systems, and applications, managing and understanding the functionality of some security tools has become too complex for all but the most sophisticated of users. One such example of a security tool that has become notoriously complex to manage is modern network firewalls. A firewall can be a device or set of devices designed to permit or deny data transmission both in and out of a system, including transmissions over a network transmissions. A firewall's operation can be based upon a set of rules or policies and can be used, for instance, to protect networks and systems from unauthorized access by nefarious users and programs, while still permitting legitimate communications. In some instances, operating systems can also include software-based firewalls to protect a corresponding system or host from various threats, such as threats commonly found and delivered via the Internet.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-3I are screenshots of example user interfaces illustrating analytics of security events and security policies in accordance with at least some embodiments;

FIGS. 4A-4B are simplified flowcharts illustrating example operations associated with at least some embodiments of the system.

Like reference numbers and designations in the various drawings indicate like elements.

DETAILED DESCRIPTION OF EXAMPLE EMBODIMENTS

Overview

Figure 1:
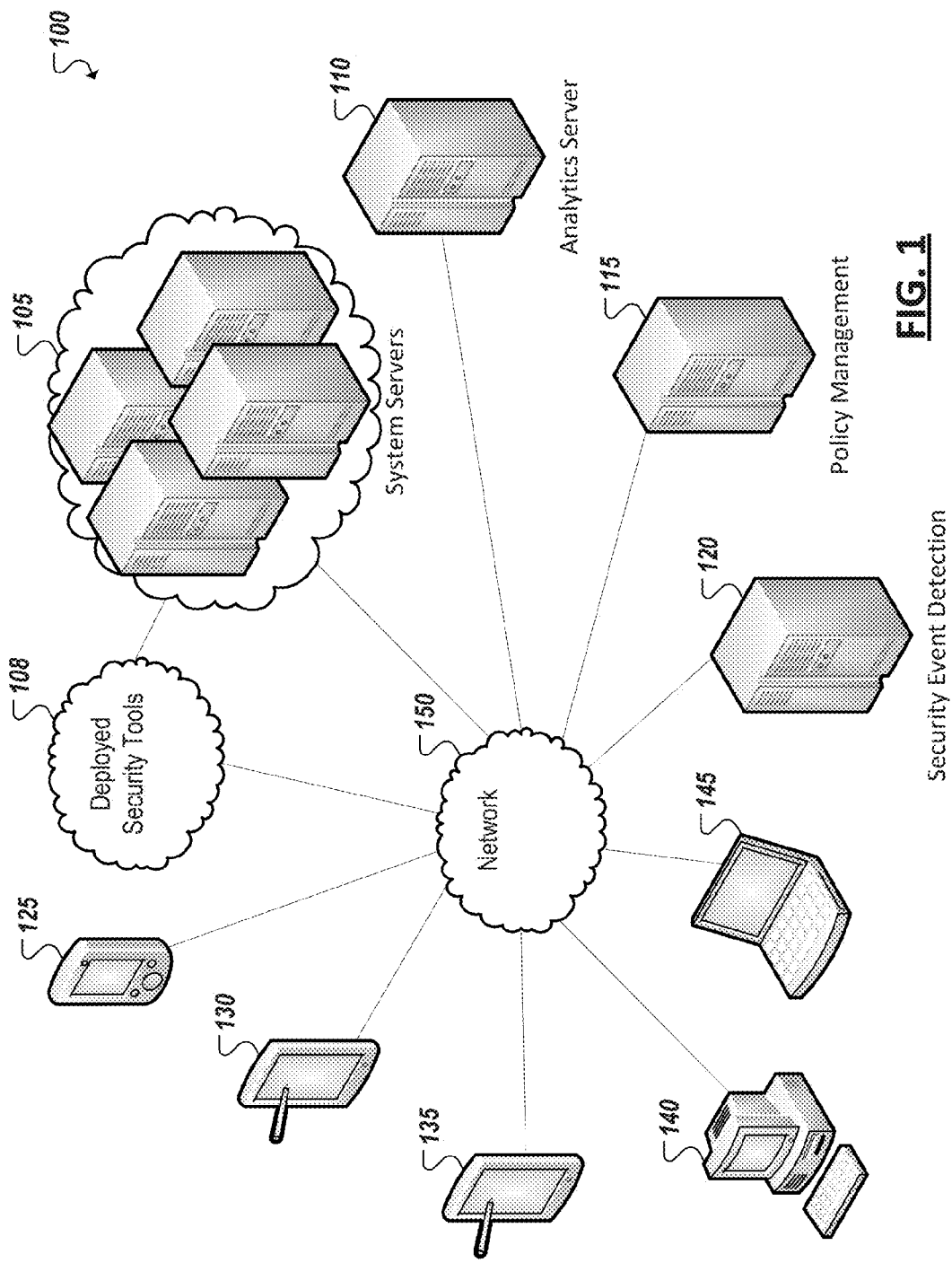
FIG. 1 is a simplified schematic diagram of an example computing system including security event and security policy management functionality in accordance with one embodiment.

In general, one aspect of the subject matter described in this specification can be embodied in methods that include the actions of identifying a plurality of security events detected in a computing system, each security event in the plurality of security events based on at least one policy in a plurality of security policies defined for the computing system. A first representation of the plurality of security events can be presented in an interactive graphical user interface, the first representation including a plurality of selectable event elements, each event element representing at least one security event in the plurality of security events. A user selection of a particular event element presented in the first representation can be received via the interactive graphical user interface. A subset of the plurality of security policies can be identified, each security policy in the subset serving as a basis for at least one particular security event represented by the particular event element.

Further, in another general aspect, one aspect of the subject matter described in this specification can be embodied in methods that include the actions of identifying a plurality of security events detected in a computing system, each security event in the plurality of security events based on at least one policy in a plurality of security policies defined for the computing system. A first representation of at least a portion of the plurality of security policies can be presented in an interactive graphical user interface, the first representation includes a plurality of selectable policy elements, each policy element representing at least one security policy in the plurality of security policies. A user selection can be received, via the interactive graphical user interface, of a particular policy element presented in the first representation. A subset of the plurality of security events can be identified, each security event in the subset based at least in part on at least one particular security policy represented by the particular policy element Further, in another general aspect, a system can be provided including at least one processor device, at least one memory element, and a security event user interface engine. The security event user interface engine, when executed by the processor, can identify a plurality of security events detected in a computing system, each security event in the plurality of security events based on at least one policy in a plurality of security policies defined for the computing system, present a first representation of at least a portion of the plurality of security policies in an interactive graphical user interface, the first representation of the portion of security policies includes a plurality of selectable policy elements, each policy element representing at least one security policy in the plurality of security policies. The security event user interface engine can further be adapted to receive a user selection, via the interactive graphical user interface, of a particular policy element presented in the first representation, and identify a subset of the plurality of security events, each security event in the subset based at least in part on at least one particular security policy represented by the particular policy element. Further, a security event user interface engine can present a second representation of the plurality of security events in an interactive graphical user interface, the second representation of the plurality of security events including a plurality of selectable event elements, each event element representing at least one security event in the plurality of security events. The security event user interface engine can further be adapted to receive a user selection, via the interactive graphical user interface, of a particular event element presented in the second representation and identify a subset of the plurality of security policies, each security policy in the subset serving as a basis for at least one particular security event represented by the particular event element.

These and other embodiments can each optionally include one or more of the following features. The plurality of security events can be provided by at least one security tool adapted to detect security events in a computing system. The at least one security tool can include a firewall. The particular event element can represent at least two particular security events and the subset of security policies includes all security policies serving as a basis for any one of the at least two particular security events. The subset of security policies can include at least two security policies. The at least one particular security event can be triggered in response to a detected violation of at least one of the subset of security policies. The selection of the particular event element can cause a window to be displayed including a view of attributes of the at least one particular security event. A listing of the subset of security policies can be presented in the same graphical user interface as the presentation of security events (and vice versa). A particular security policy presented in the listing of the subset of security policies can be selected and can cause a window to be displayed including a view of attributes of the particular security policy. User inputs can be received, via the window, indicating a modification to the particular security policy and the particular security policy can be modified in accordance with the indicated modification.

Further, embodiments can include one or more of the additional, following features. A request can be received to edit a particular one of the subset of security policies, and the particular security policy can be modified in accordance with user inputs received via the interactive graphical user interface. A security tool can apply the modified particular security policy to monitoring of a computing system. Applying the modified particular security policy to monitoring of the computing system can include identifying a violation, during the monitoring, of the modified particular security policy, generating a particular security event based on the violation, and providing data for use in a representation the particular security event in the interactive user interface. An attribute of at least the particular security event or the subset of security policies can be defined in a particular corresponding data object, in a plurality of data objects of the computing system. The first representation (of either events or policies) can include a graphical representation of data in the particular data object representing attributes of the at least one particular security event. The graphical representation of the data in the particular data object can include a selectable object element and selection of the selectable object element in the graphical representation of the particular data object can cause an object view window to be presented in the interactive user interface presenting a view of the particular object. User inputs can be received via the object view window, indicating a modification to the particular data object, and the particular data object can be modified in accordance with the indicated modification, the modification affecting subsequent security tasks performed by one or more security tools using the particular data object. The representation of events can include a bubble representation including a plurality of graphical bubble elements, each graphical bubble element being a selectable event element, and each graphical bubble element representing a corresponding amount of events detected for a corresponding intersection of two respective event attributes. A representation of events can include an event trend chart representation including a plurality of chronological trend line elements, each chronological trend line element being a selectable event element, and each chronological trend line element representing security events in the plurality of security event detected within a corresponding time period.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a system of computing devices (e.g., 105, 125, 130, 135, 140, 145) monitored by one or more security tools 108. Some of these security tools 108 can be resident on system servers 105 and devices 125, 130, 135, 140, 145, while other security tools 108 can be provided as services, for instance, using computing devices and infrastructure remote from the system servers 105 monitored by the tools. System 100 can further include an analytics server 110, policy management server 115, and security event detection server 120 provided in connection with one or more security tools 108 monitoring system servers 105. User endpoint devices (e.g., 125, 130, 135, 140, 145) can also be provided in system 100. In some instances, one or more endpoint devices (e.g., 125, 130, 135, 140, 145) can interact with and consume services and resources hosted by system servers 105, for instance, over one or more networks 150. Indeed, in some instances, one or more endpoint devices (e.g., 125, 130, 135, 140, 145), as well as one or more of analytics server 110, policy management server 115, and security event detection server 120, can be considered included within a system of computing devices including system servers 105, such as an enterprise software system. Further, some security tools implemented in the system can be deployed on or otherwise monitor endpoint devices 125, 130, 135, 140, 145 and computing devices implementing one or more of analytics server 110, policy management server 115, and security event detection server 120.

Security tools 108 used to monitor a system can collect various data relating to the security tools' operation and the events, transactions, and system devices and components monitored by the security tools. Security tools 108 can include software- and/or hardware-based tools including firewalls (FWs), web gateways, mail gateways, client-based user risk assessment engines, host intrusion protection (HIP) tools, network intrusion protection (NIP) tools, anti-virus and anti-malware scanners and removal tools, host-based and/or network-based data loss prevention (DLP) tools, vulnerability managers, system policy compliance managers, asset criticality tools, security information management (SIM) products, among other security tools. Security tools 108 can be deployed on one or more endpoint devices (e.g., 125, 130, 135, 140, 145), network elements (e.g., of network 150), system servers 105, or other components of a particular system. One or more of the deployed security tools 108 can operate and protect system components according to a corresponding set of rules or policies dictating, for instance, conditions for intervention, filtering, blocking, monitoring, event or alert detection, traffic shaping, or other security tasks performed by security tools 108. Additionally, security tools 108 can detect particular events relating to the security of the system and the operations of the respective security tools 108, such as detected threats, network use violations, detected vulnerabilities, system use violations, system errors, unauthorized access attempts, and other events and can collect, store, and report data collected in connection with the monitoring and detection of events. Events detected using security tools 108 can themselves be based, at least in part, on rules and policies of security tools 108 and the monitored system.

Security data relating to actions and policies of deployed security tools 108, as well as data relating to the monitoring and detection of security events, can be collected and maintained by particular security tools substantially independent of other data collected or maintained by other security tools and system components. Security data can be identified, categorized, and aggregated by one or more system components, including a policy manager server 115 adapted, for instance, to collect, receive, and otherwise aggregate security data relating to various security policies and rules employed by one or more security tools. Additionally, a security event detection server 120 can, in some implementations, similarly collect and aggregate data describing attributes of events and conditions within the monitored systems and components as detected by various security tools 108.

An analytics server 110 can be provided to assist users in analyzing and processing data collected from system security tools 108, such as through policy management server 115 and security event detection server 120. Analytics server 110 can include data analytics software allowing users to view, sort, filter, organize, perform analytics calculations and operations, as well as other tasks on security data, including security data organized by policy management server 115, security event detection server 120, or other tools in system 100. Analytics server 110 can be used in connection with the generation of graphical user interfaces (GUIs) including various views and representations of security data and allowing users of devices (e.g., 125, 130, 135, 140, 145) to perform analytics on security data generated and collected by security tools 108.

In general, "servers," "clients," and "computing devices," including computing devices used to implement system 100 (e.g., 105, 108, 110, 115, 120, 130, 140), can include electronic computing devices operable to receive, transmit, process, store or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers, clients, and computing devices (e.g., 105, 108, 110, 115, 120, 130, 140) can each include one or more processors, computer-readable memory, and one or more interfaces, among other features and hardware. Servers can include any suitable software component or module, or computing device(s) capable of hosting and/or serving a software application or services (e.g., services of analytics server 110), including distributed, enterprise, or cloud-based software applications, data, and services. For instance, servers can be configured to host, serve, or otherwise manage data sets, or applications interfacing, coordinating with, or dependent on or used by other services, including security-focused applications and software tools. In some instances, a server, system, subsystem, or computing device can be implemented as some combination of devices that can be hosted on a common computing system, server, server pool, or cloud computing environment and share computing resources, including shared memory, processors, and interfaces.

Endpoint computing devices 125, 130, 135, 140, 145 can include laptop computers, tablet computers, smartphones, personal digital assistants, handheld video game consoles, desktop computers, internet-enabled televisions, and other devices capable of communicating with and operating in connection with other computing devices, including, analytics server 110 and/or system servers 105 over one or more networks 150. Attributes of endpoint computing devices 125, 130, 135, 140, 145 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 125, 130, 135, 140, 145). Other device attributes can also include peripheral devices connected or otherwise accessible to the device, and the types of network technology for which the device is adapted.

Each endpoint computing device can include at least one graphical display device and user interfaces allowing a user to view and interact with graphical user interfaces of applications and other programs provided in system 100, for instance through analytics server 110. In general, endpoint computing devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Despite providing critical protection to computing systems and resources, modern security tools can be difficult to manage and accurately deploy. For large enterprises and system, firewalls, policy compliance, anti-malware, and other security tools deployed therein can be governed by a dizzying array of policies and rules crafted for the potentially limitless and diverse issues and uses of the enterprise's systems and security tools. For example, firewall deployed in an enterprise can be tasked with blocking "bad" traffic from passing (i.e., entering or exiting), while still allowing good (and important) traffic of the enterprise to flow freely, among other functions. Achieving this can involve defining thousands of granular rules and policies governing what traffic to allow or block, when to do so, who (i.e., which users) to allow or deny, and under what conditions. For example, firewall rules can vary depending upon on the source or destination of particular traffic (e.g., with high-level executives, HR personnel, IT personnel being afforded certain Internet access privileges that other administrative, engineering, accounting, or other employees are denied), among other examples. Managing this web of policies, as well as a similarly complicated web of security tools in a system, can be a challenge, especially as inconsistencies arise in system security, such as identified instances of over- or under-enforcement of certain security policies. Traditional security solutions, while attempting to provide users with granular control over security management, can often overwhelm all but the most sophisticated of users with the corresponding complexity of their own solutions, GUIs, and security management tools. A system for managing security within a system including integration of security events and policy, such as outlined in FIGS. 1 and 2, can resolve these issues, among others.

Figure 2:
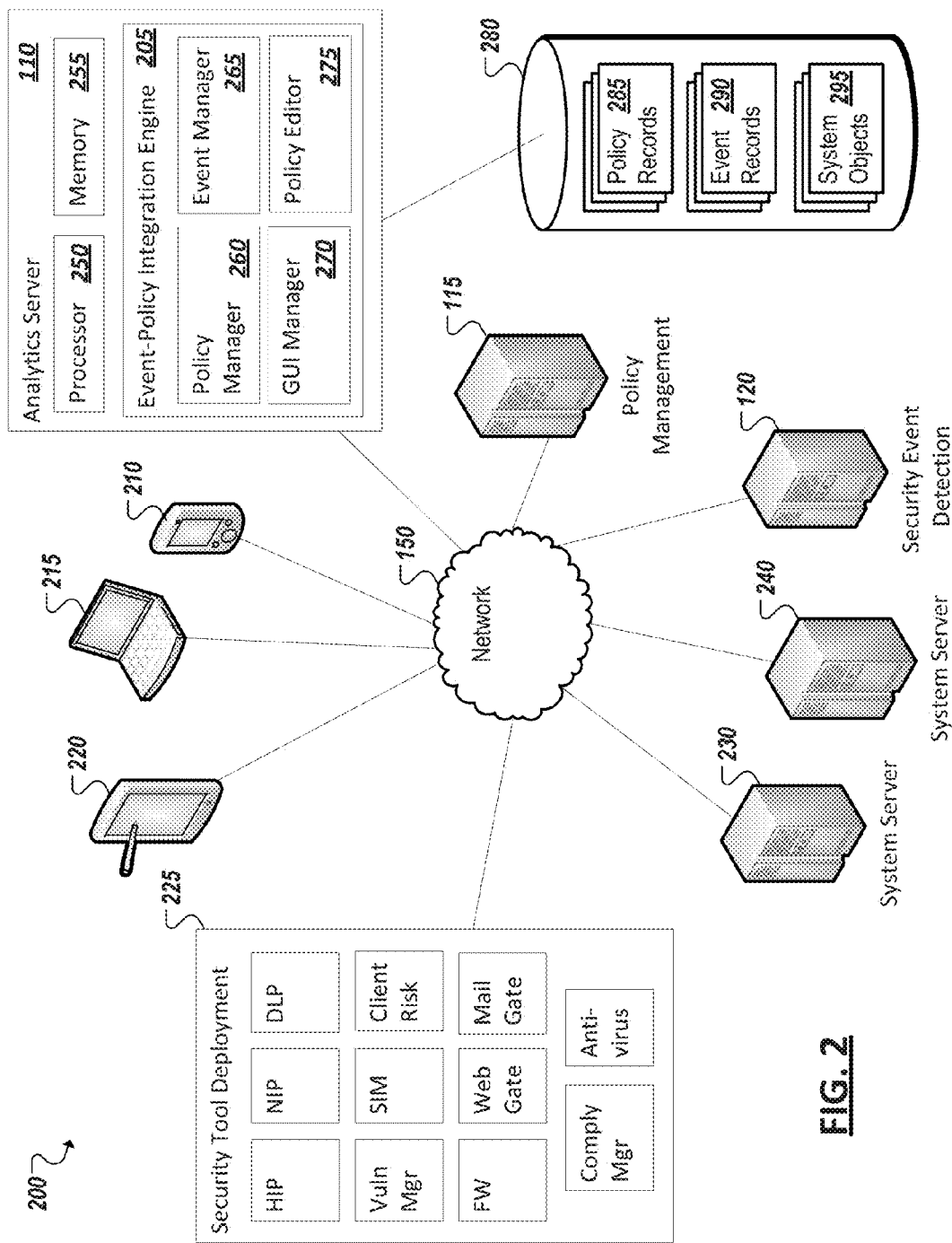
FIG. 2 is a simplified block diagram of an example system including an example analytics server in accordance with one embodiment.

Turning to FIG. 2, a simplified block diagram 200 is shown of an example system including an example analytics server 110 providing an event-policy integration engine 205. Analytics server 110 can communicate with and provide data and services for use in developing and rendering GUIs on endpoint devices 210, 215, 220 utilized by users to analyze security conditions for a system (e.g., including one or more of endpoint devices 210, 215, 220, network 150, servers 230, 240, among other devices and system components. Such GUIs can include interactive tables, graphs, infographics, and other graphical representations of security data collected by or relating to one or more security tools (e.g., 225) deployed on the system. Users can interact with the GUIs displayed on endpoint devices (e.g., 210, 215, 220) and perform analytics tasks, including filtering, examining, comparing, sorting, ranking, correlating, and analyzing security data, both in its raw form as well as organization and graphical representations of data generated in part by analytics server 110 and in part by software operating at the respective endpoint devices (e.g., 210, 215, 220).

In one particular example implementation, analytics server 110 can include one or more processor devices 250 and one or more machine-readable memory elements 255 for use in executing one or more software programs, including at least a portion of an event-policy integration engine 205. An example implementation of event-policy integration engine 205 can include multiple components and functionalities such as a policy manager 260, event manager 265, GUI manager 270, and policy editor 275, among other potential components. In some implementations, one or more components of event-policy integration engine 205 can be distributed and provided on client-based analytics applications, such as analytics applications installed on endpoint devices 210, 215, 220.

A policy manager 260 can collect and provide data and analytics support for security policies relating to operation of one or more security tools in a system. Policy manager can pull, collect, or otherwise access data aggregated at policy management server 115 or directly from one or more corresponding security tools 225. Some of this data can be derived from data objects 295 maintained for the system. System data objects 295 can include data structures defining relationships and attributes within the system such as users, user groups, offices, departments, locations, computing devices, software applications and application categories, and other real-world attributes, people, locations, programs, business entities, organizations, devices, and other things relating to the system. As an example, system data objects can include objects from an LDAP system or Active Directory relating to users and user groups, and user authorization within a system, and policies can be in place relating to the management of such users, etc. More generally, policy manager 260 can manage one or more databases and/or other data structures (e.g., 285) including data identifying policies and rules controlling one or more security tool deployments 225 and describing attributes of the policies and rules. Policy data 285 can include information such a name, address, or other identifier of the policy; the security tool(s) to which it applies; the type or category of security tool action controlled by the policy; the administrative or geographic zones to which it belongs; the applications, components, and/or devices controlled, monitored, and/or protected by security tools according to the policy; groupings of devices or users controlled by the policy; an indication of the importance or criticality of the policy and its constituent components; the types of alerts or events triggered by violations of the policy, among other policy attributes.

Event manager 265 can collect and provide data and provide analytics support relating to security events detected in a system (e.g., at security tools 225), including events triggered as violations of a particular policy. Event manager can pull, collect, or otherwise access data aggregated at security event detection server 120 or directly from one or more corresponding security tools 225. Event manager 265 can manage one or more databases and/or other data structures (e.g., 290) including aggregated security event data identifying attributes and characteristics of detected security events. Some of this data can be derived from system objects 295. Such security event data can include an identifier of the event; a device or subsystem involved in the security event (as well as the location, user, or manager of the device); the number of events detected; the time the event was detected; identification of policy violations triggering the event; what actions, programs, or computing resources were in violation the policy; a logical system grouping associated with the security event (e.g., a department, business unit, type of device, etc.); a calculated level of risk attributable to one or more characteristics of the event; identification of the time since the most recent similar security event occurred, or other history data describing prior security event detections; criticality, severity, outcome, or impact of the event; whether the event has been remedied or assigned to a ticket, IT professional, etc. for resolution, and the status of the tickets or related tickets; among other examples.

In addition to managing policy data and security event data respectively, policy manager 260 and event manager 265 can each provide additional functionality tailored to performing particular analytics operations on and providing GUI presentations and graphical representations, in connection with GUI manager 270, based on the corresponding policy data 285 and event data 290. Further, GUI manager 270 can integrate GUI elements, such as windows, panes, graphical representations, controls, and other GUI elements of different contexts, including policy-centric contexts and event-centric contexts. A context can correspond to a logical category, subject, or theme through which particular data can be viewed, organized, or represented, for instance in analytics operations, GUIs, or other analytics application features. Indeed, users can interact with one or more GUIs provided for a first context (i.e., a policy-centric or event-centric context) in connection with performing one or more analytics operations within this first context and then initiate the generation and/or presentation of additional GUI elements presented in the second context (i.e., the other of the policy-centric or event-centric context). GUI elements presented in the second context can show how interactions in the first context relate to the second context. A GUI manager 270 can provide this integration.

As a simplified example, a user can view a listing, infographic, or other graphical representation of a set of security events (i.e., in the event-centric context). The user can perform filtering, ranking, sorting, searching, joining, calculations, and other analytics operations that result in an identification of a different set of data describing the security events, such as a selected subset of the set of security events or calculation results based on security event data. For instance, a user can interact with an event-centric GUI element to select all events detected within the last month involving a particular user of the system. The user can then interact with the GUI element to request identification of a separate policy-centric GUI element identifying all security policies identified as corresponding to the events detected or detectable for the user. In addition, the policy-centric GUI element can include policy-centric information, graphic representations, infographics, etc. describing attributes of each of the identified policies as well as policy-centric analytics operations (e.g., filters, rankings, calculations, organizations, etc. that are specific to the analysis of security policy data). Further, in some instances, GUI controls can be provided in the policy-centric GUI element, such as a button or other control, providing the user with the ability to initiate editing of one or more of the security policies, or any of their constituent elements, identified in the policy-centric GUI element. For instance, a policy editor 275 can be provided that enables editing of security policy parameters, for instance, in connection with monitoring, quality control, deployment, and maintenance of one or more security tools. Indeed, a GUI integrating policy-centric and event-centric contexts can provide users with a workflow for quickly identifying, diagnosing, and remedying policy- and event-related issues in a system, at a low computational and cognitive cost. Modifications made and initiated from such a GUI, employing functionality provided, for instance, by policy editor 275, can affect and modify the vary operation of security tools 225 deployed in the system.

Turning to FIGS. 3A-3I, screenshots 300a-i are shown of example user interfaces provided, at least in part, through functionality of an analytics server and/or one or more security analytics programs. Screenshots 300a-i are provided as examples of possible GUIs allowing integration of policy-centric and event-centric contexts, as well as potential tasks capable of being performed in connection with an example event-policy integration engine and example analytics programs. For instance, in FIG. 3A, a screenshot 300a is shown illustrating an example graphical user interface (GUI) 301 capable of integrating views in policy-centric and event-centric contexts. In the particular example of FIG. 3A, tabs 302, 304 are provided to allow the user to select an initial context to begin with in an analysis of system security, such as an event-centric context (i.e., 302) or a policy-centric context (i.e., 304). Further, additional tabs (e.g., 305a) can be provided relating to general categories of general functionality of a particular security tool or type of security tool addressed within a particular analysis. For instance, in the examples of FIGS. 3A-3I, GUI 301 has been presented in connection with the analysis of one or more network firewalls in a system. Other GUIs (e.g., with different categories of functioning and corresponding tabs (e.g., 305a)) can be provided in connection with the analysis of other types of security tools (e.g., other than a network firewall).

Figure 3A:
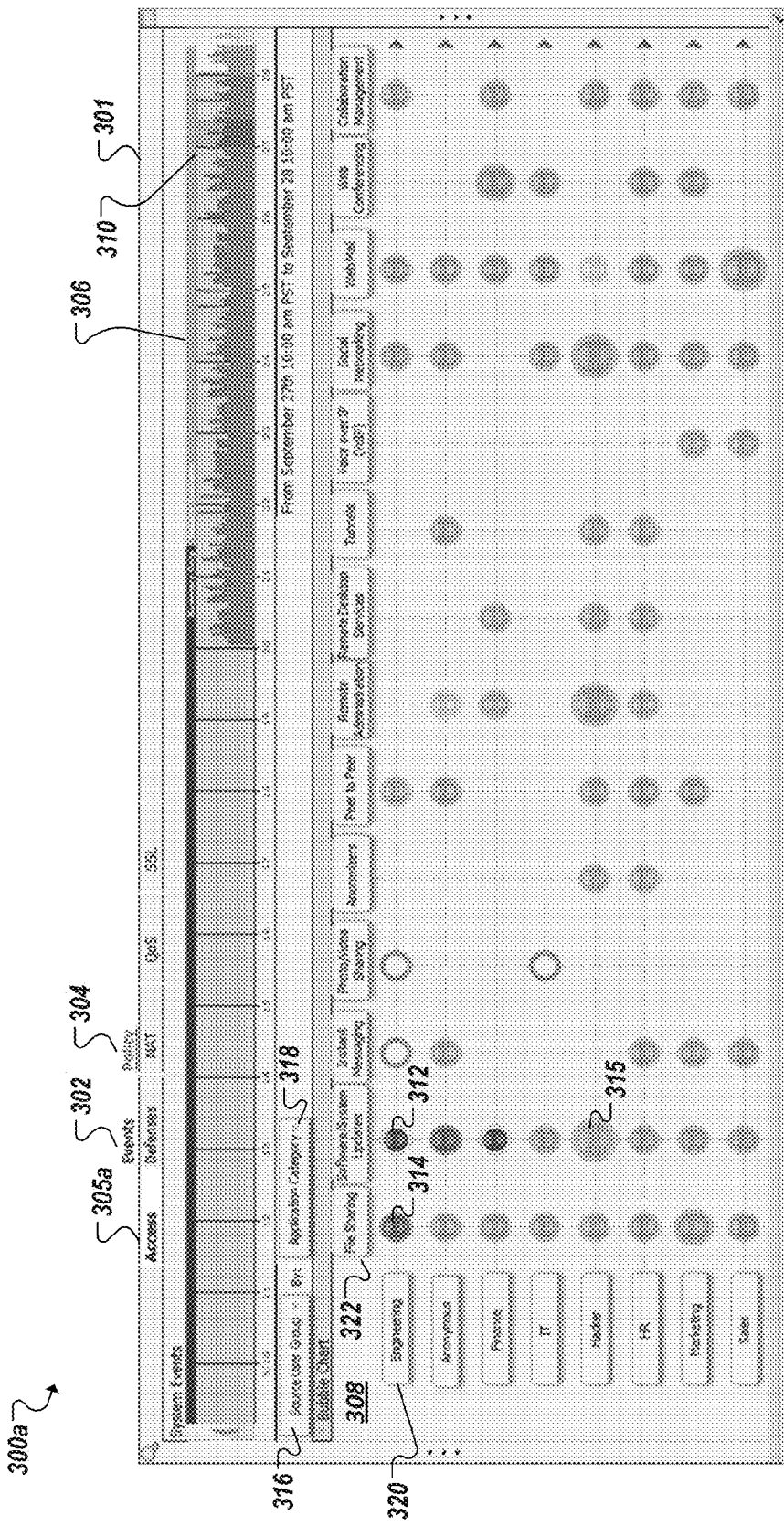

In the particular example GUI 301 of FIG. 3A, a category of views relating to a firewall's access rules and activities has been selected, for instance, through a user's selection of tab 305a. Further, one or more GUI windows (e.g., 306, 308) have been presented (for instance, in connection with a user's selection of these particular views, infographic types, etc.). In this example, infographics are presented including an event trend chart 306 and a bubble chart 308.

An event trend chart can present a series of columns distributed horizontally across a span of time, for instance, with each column ordered chronologically and illustrating a total number of security events detected in a particular system at a particular time. In some instances, as shown in FIG. 3A, event trend chart 306 can include columns as proportional stacked columns, where each column is illustrated in two or more colors, at least one of the colors highlighting what portion of the overall amount represented by the column was contributed to by a particular type of event (e.g., "Access," "Defenses" (e.g., relating to defensive measures available through the firewall), "NAT" (e.g., relating to network address translation services available through the firewall), "QoS" (e.g., relating to quality of service functions provided through the firewall), "SSL" (e.g., relating secure socket layer communication services provided through the firewall), among potentially others). In the example of FIG. 3A, tab 305a has been selected by the user, resulting in the event trend chart 306 showing a graphical representation of the access-related events detected involving one or more firewalls.

Event trend chart 306 can be used to filter a set of security events identified for a particular category of events (e.g., access-related events). In one sense, the selection of tab 305a filters the universe of security events detected for a firewall, while an event trend chart GUI element 306 can be utilized by a user to further filter and refine the set of security events a user wishes to examine, analyze, and manage. For instance, as shown in the example of FIG. 3A, a user can select a section (e.g., 310) of a displayed event trend chart 306 to note that the user is interested in seeing and analyzing data relating to events detected within a particular time period corresponding to the selected section 310. In response to interacting with event trend chart 306, additional GUI elements can be generated relating to the subset of access-related events detected within the time range identified through selected section 310. For instance, in some examples, a magnified view of the event trend chart can be generated and presented to the user corresponding to the portion of the event trend chart 306 included in selected section 310. Accordingly, portions or elements of the magnified trend chart such as a particular column or a subdivided section of a column (i.e., corresponding to a sub-category of events detected for the firewall), could be selected by a user to further narrow and analyze a set of security events. Further, as the subset of security events analyzed or filtered by the user narrows, data and representations of the data for the subset of security events can be presented in increasing detail and granularity.

In the example of FIG. 3A, an additional GUI element 308 has been generated, specifically a bubble graph of security events corresponding to the portion of detected security events within selected section 310 of event trend chart 306. In some instances, a user can select the type of infographic or data represented in GUI 301 from a plurality of available data representation types. The types of data representations available for the data can be dependent on the context of the analysis being performed by the GUI or GUI window. For instance, an event trend chart (e.g., 306) and bubble chart (e.g., 308) can be pre-identified and associated with an event-centric context, and made available for a user in connection with analyses within this event-centric context.

A comparative bubble chart, such as the example bubble chart 308 of FIG. 3A, can allow a user to compare two or more sets of attributes of security events identified in the subset of security events to be represented using the bubble chart. For instance, a user can be presented with controls 316, 318 allowing a user to select two attributes with which to compare a subset of security events. In the example of FIG. 3A, a user has elected to analyze security events that intersect different source user groups and application categories. Accordingly, a two dimensional chart can be created, in this example, with user groups occupying the y-axis and system application categories occupying the x-axis. Further, at the intersection of each of the respective user groups and application categories a bubble element (e.g., 312, 314, 315) can be generated and rendered within the GUI 301 representing an amount (and, in some cases, type, criticality, ownership, or another attribute) of security events detected within the subset that relate to both a particular user group and a particular application category. To illustrate, bubble element 312 can represent the number of events within a subset of security events that were detected in connection with operation of software applications of a category "Software/System Updates" by users within an "Engineering" user group. For example, such security events could pertain to a particular user within an enterprise's engineering department who attempt to download an unauthorized software update from a remote source. In another example, bubble element 314 can relate to security events detected in connection with operation of software application of a category "File Sharing" by users in the Engineering user group.

Comparative bubble charts can provide users with the ability to custom define and analyze a variety of different views of security events in an identified subset of security events. The diameter of the bubble elements (e.g., 312, 314, 315) can represent the relative number of security events detected for a particular categorical comparison or cross section. For instance, a bubble element 315 (with a relatively large diameter) can identify that a relative large number of security events were detected relating to a "Hacker" user group with regard to "Software/System Updates." Alternatively, in some instances, other cross-sections will have bubbles with a narrow diameter (or no bubble at all) indicating that few if any of the identified subset of security events include both of these attributes. For instance, no bubble is shown in connection with a cross-section of "Instant Messaging" events and users in the "IT" user groups (for instance, because members of an enterprise's IT department are granted the privilege (i.e., as enforced by the firewall) to more liberally use an enterprise's network for instant messaging).

As alluded to above, some instances of a comparative bubble chart can illustrate attributes of a subset of event beyond event attributes identified in the intersecting elements (e.g., individual user group and application type), and the number of events (i.e., shown via the diameter of a corresponding bubble element). For example, various visual effects can be applied to a bubble element to illustrate further characteristics and attributes of the events identified in a respective bubble element. For instance, ownership or responsibility for particular subset of security events can be shown (e.g., by showing some of the bubble elements (e.g., 312, 314) in high contrast in contrast to other bubble elements (e.g., unassigned elements) in lower contrast, or as hazy or semi-transparent bubbles (e.g., bubble 315). Further, bubble elements can be color-coded to identify other attributes of the events represented by the respective bubble, such as the type of event, criticality of the event, among other attributes. Indeed, in the example of FIG. 3A, bubble elements in a first color (e.g., 314, 315) can identify groupings of security events that include or are within a particular category of interest (e.g., the "Access" events category) as specified by the user (e.g., through the selection of GUI element tab 305a), while bubble element in a second color (e.g., 312) identify groupings of security events that do not include events of the selected category of interest.

It should be understood that the infographics and graphical representations (e.g., 306, 308) shown in the examples of FIGS. 3A-3I are non-limiting examples merely provided to illustrate certain features and aspects discussed herein. A variety of other types of infographics and graphical data representations can also be adopted and used without departing from the subject matter of the present Specification. For instance, as noted above, infographics of different types can be utilized for other contexts, such as policy-centric contexts. Additionally, other types of graphical representations of data can also be provided for security-event-centric analyses. For example, varieties of a geographic map infographic can be generated to illustrate the location (i.e., on a geographic map) of security events identified for system components together with the number, type, frequency, etc. of security events in various, corresponding geographic locations. Indeed, in some examples, a geographic map infographic can be provided possessing some of the properties of a bubble-type graph, such as through bubbles displayed corresponding to particular map locations, each bubble (through their respective diameters) illustrating the relative number of security events were detected in connection with a particular geographic location, among many other examples.

Regardless of the type, form, organization, and aesthetics of a particular GUI element, such as GUI graphical data representations 306, 308, GUI 301 can present one or more GUI elements to a user that include user-selectable GUI elements. A graphical data representation, in some instances, can include a plurality of user-selectable GUI elements. The selection of a user-selectable element or GUI object can cause additional views to be selected, the set of data to be further filtered, particular analytics operations and calculation to performed, etc. For example, individual columns, groupings of columns, and time ranges displayed in event trend chart (e.g., 306) can be selectable by a user (such as described above in connection with selected section 310). Further, bubble chart 308 can include a plurality of different selectable GUI elements, such as each bubble element (e.g., 312, 314, 316), as well as each comparison category indicator (e.g., 320, 322).

Figure 3B:
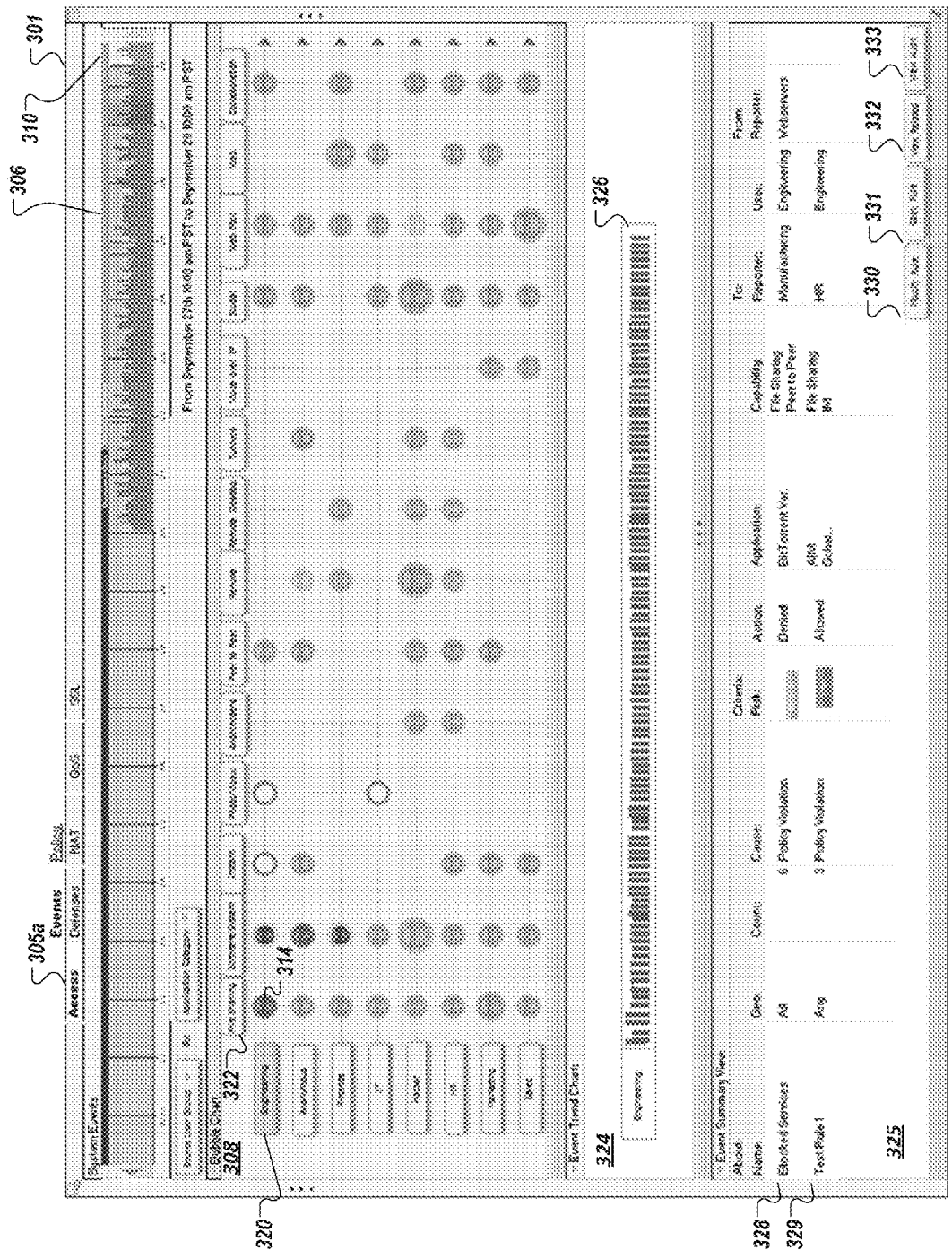

To illustrate, as shown in the example of FIG. 3B, a user has selected the comparison indicator button 320 to further narrow the subset of security events considered in the user's analytics session to those security events in the subset that involved one or more users in the "Engineering" user group. In response to the user's interaction with and selection of comparison indicator button 320, additional GUI data representations (e.g., 324, 325) can be generated. Indeed, in some examples, GUI data representations (e.g., 325) of a different context (e.g., the policy-centric context) can be automatically generated and displayed in the same GUI 301 (or a related GUI window) illustrating the effects of the user's selection of comparison indicator button 320 from the perspective of the other context. In some instances, a user can select or be presented with available types of GUI data representations to populate additional windows or panes of GUI 301 (such as GUI elements 324, 325).

As shown in the particular example of FIG. 3B, additional GUI data representations (e.g., 324) can be provided responsive to interactions and analytics operations performed by a user through other GUI data representations (e.g., 320). For instance, the subset of data considered in an analytics session can be narrowed, broadened, or supplemented with new data (such as calculation results or newly received data) in response to a user's interactions with the GUI 301. Further, other GUI data representations, including GUI data representations introduced to or generated in the GUI 301 in response to or otherwise subsequent to a user's earlier interactions with the GUI 301 can use and represent the narrowed (or broadened, supplemented, etc.) data set resulting from the previous user interactions with the GUI 301. As an example, in FIG. 3B, the user has narrowed the considered subset of data to the data pertaining to the subset of security events involving system users in an Engineering user group. Accordingly, in this particular example, new GUI data representation 324 includes another event trend chart-type GUI graphical data representation 326, magnified to show those columns included in selected section 310. Additionally, magnified event trend chart 326, rather than showing all security events within this category of events and selected time period, restricts the event trend chart to security events involving the identified subset of security events involving system users in an Engineering user group. Further, a user can interact with event trend chart 326 to perform additional analytics tasks, for instance, by selecting an individual column GUI object within the event trend chart 326.

Additionally, as noted above, new GUI data representations can additional include data representations of the policy-centric context. For instance, data representation 325 can include a table identifying all of the policies (e.g., 328, 329) within a library of policies maintained for the corresponding security tool (or a plurality of system security tools) that are triggered or otherwise drive one or more events in the subset of security events selected by the user through the selection of other GUI elements (e.g., 305a, 310, and 320). This can allow a user to quickly and intuitively identify and assess the background policies within a set of security events of interest. The policy-centric data representation included in screenshot 300b of GUI 301 can include policy-centric fields, GUI controls and elements, and analytics functionality tailored to the analysis of security policies. In the particular example of FIG. 3B, table data representation 325 include a fields identifying policy attributes for a subset of relevant policies 328, 329 including a name of the policy, geographical regions to which the policy applies, a summary identification of the number of recent events (e.g., or number of events in the user-selected subset of events) based on the respective policy, one or more software applications to which the policy applies, the "capabilities" or types of applications or systems uses to which the policy applies, the criticality of the policy, actions associated with the policy, user groups effected by the policy, identification of categories of system components monitored or coordinated within in connection with the policy, among other examples. Further, a variety of policy-specific tasks can be launched from policy-centric GUI data representation 325, for instance, through GUI controls 330-333. For example, from the GUI 301 (and in accordance with a workflow beginning with analysis of security events related to the displayed policies 328, 329), a user can modify one or more policies (e.g., through control 330), copy a policy or rule (e.g., for use with another security tool or for use as the basis of a new security policy) through control 332, prompt a search of other related policies (e.g., via control 332), or view an audit report of one or more of the displayed policies (e.g., via control 333), among other potential operations and tasks.

Figure 3C:
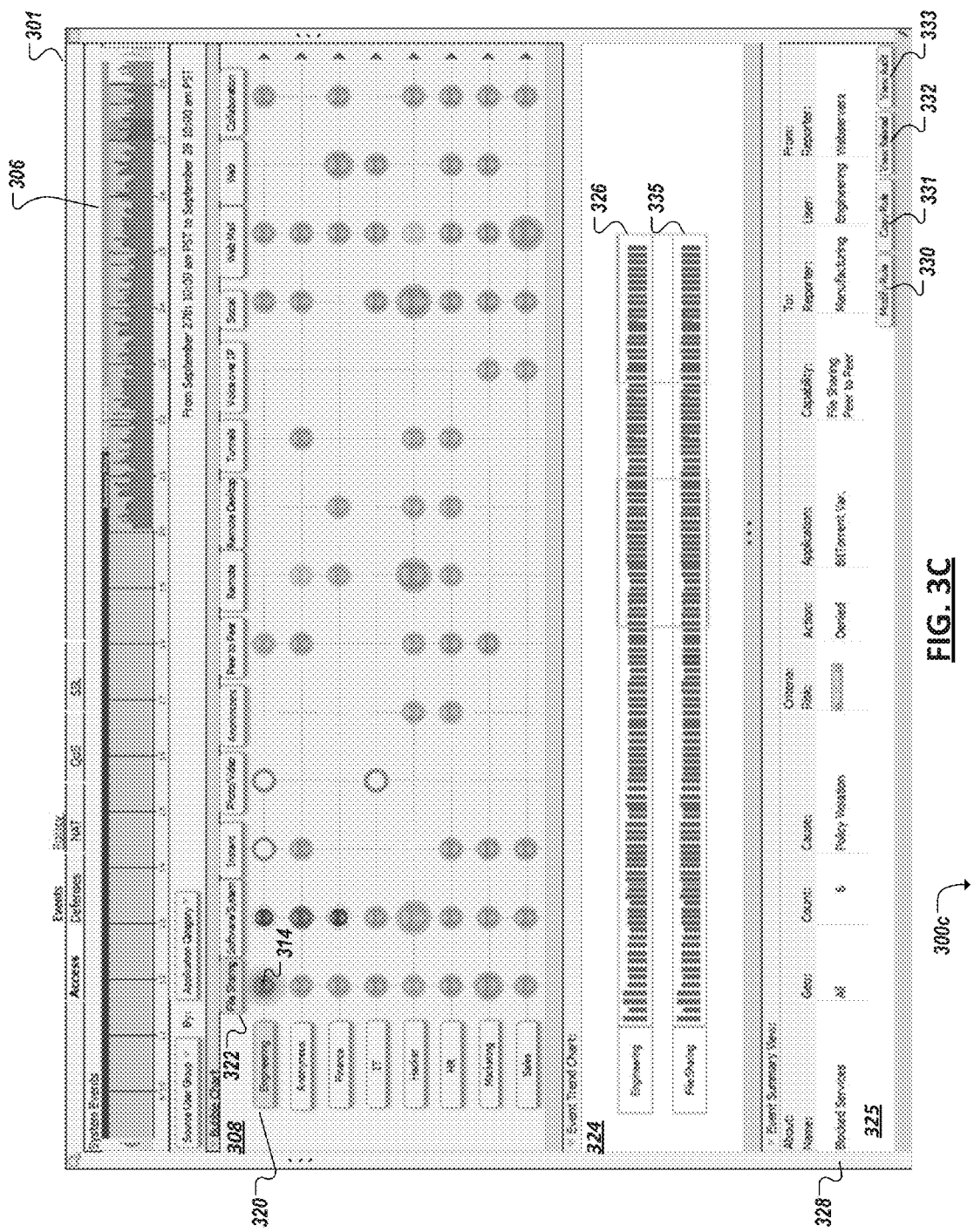

Turning to FIG. 3C, a user can utilize GUI data representations (e.g., 306, 308, 324, 328) to iteratively change the subset of data the user works with in an analytics sessions. For instance, after identifying the effect of narrowing a subset of security events to those events involving system users in an Engineering user group, the user can select other GUI elements to inspect attributes and trends of security events within a subset of event, for instance, or to identify and analyze security policies involved in various sub-categories of events. For instances, in the example of FIG. 3C, a user has selected bubble GUI element 314 to restrict the subset of security events to those security events that both involve system users in an Engineering user group and File Sharing applications. Accordingly, GUI windows 324 and 328 can be automatically updated to reflect the changed subset of data considered by the user. For example, an additional event trend chart 335 can be rendered within window 324 based on security events that involve applications in the File Sharing category. This can allow the user to further consider a data representation 335 of more detailed breakout of event trends involving file sharing within the system (e.g., during a particular time period and involving network access services of an example firewall). Further, the related policies table 325 can be updated to show that only one policy is involved in the narrower subset of security events that both involve system users in an Engineering user group and File Sharing applications.

Figure 3D:
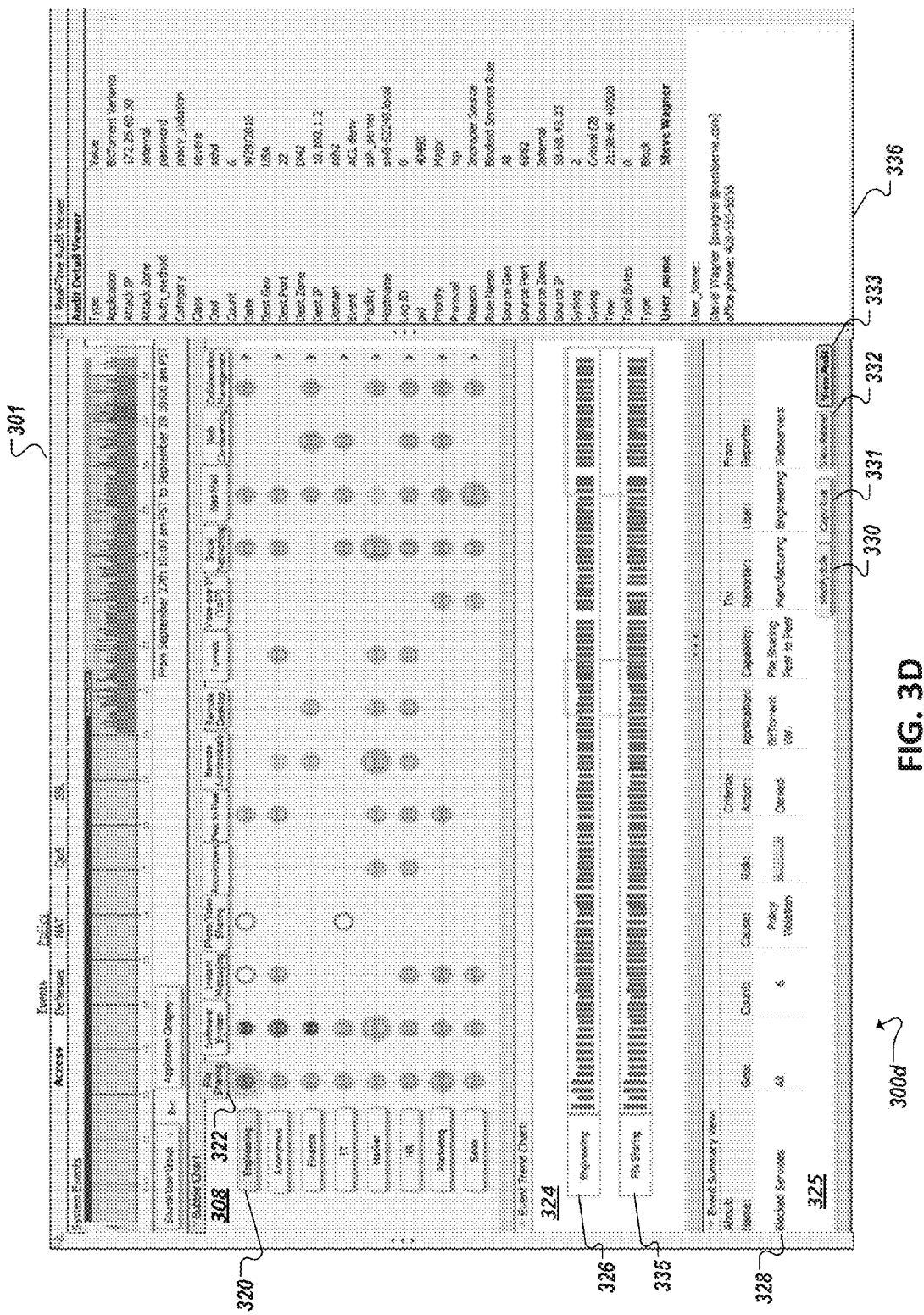

Turning to FIG. 3D, a user, upon identifying a particular policy (or policies of interest), such as in response to narrowing down a category of security events to events involving a single policy, as in the example of FIG. 3C (through interactions with data representations 306, 308, 324, and 328 in GUI 301), may desire to further inspect and perform operations involving the identified policy. For example, as shown in FIG. 3D, a user can interact with GUI controls (e.g., 333) of the policy-centric GUI window 325, to perform one or more analytics operations on the represented set of policies (e.g., policy 328). For example, through the selection of "View Audit" button 333, a new GUI window 336 can be presented in GUI 301 providing an overview of the attributes of the selected policy (e.g., 328) or a most recent event involving the policy, among other examples.

Figure 3E:
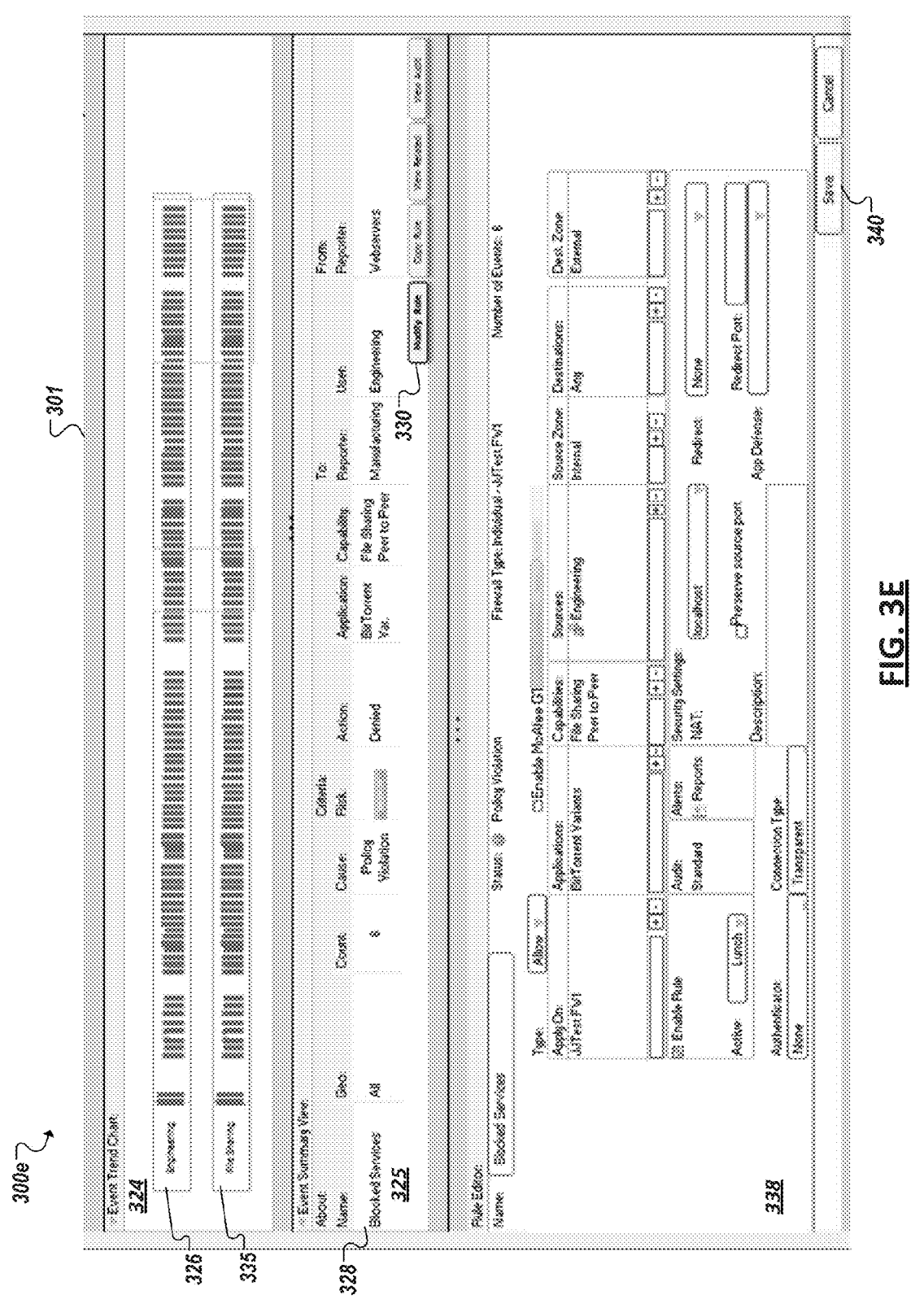

Turning to the partial screenshot 300e of GUI 301 shown in FIG. 3E, in other examples, a user can a select GUI control 330 to cause GUI window 338 to populate the GUI 301, providing the user with an interface for actually modifying attributes and the definition of the corresponding policy. The ability to modify or define a policy can represent the culmination of an analytics workflow beginning with or otherwise involving the assessment and analysis of one or more related security events. For instance, as shown in example GUI window 338, a user can add, delete, select, and otherwise change several fields defining a selected policy, such as a "Blocked Services" policy. For example, a user, such as a system administrator with permission or authorization to access and make changes to policies in the system (such permissions can be managed through additional GUI windows and prompts of GUI 301), can change such policy attributes as the type of action performed by a security tool (e.g., firewall) in accordance with the policy (e.g., Allow, Block, Quarantine, etc.), the criticality of the policy, the types of alerts that are generated in response to security events based on the policy, the portions and user of the system to which the policy will apply, the periods of the day to which the policy will actively apply (e.g., work hours, break hours, lunch, all day, weekdays, weekends, afterhours, etc.), address translation and other security functionality affected by the policy (e.g., address translation services of a firewall security tool), the applications and files to which the policy applies, among other attributes and features both included and not shown in the particular example shown in FIG. 3E.

Further, once the user has made changes to the policy definition using GUI window 338, the user can save the changes (e.g., via button 340) to cause the policies to be updated and take effect within the system. For instance, the user's interactions with GUI window 338 in GUI 301 can change the policies upon which one or more security tools are based, thereby immediately effecting change within the operation of the security tools. In this manner, a user can both analyze events and policies within a system as well as, from the same GUI 301, perform maintenance and implement updates or corrections to the security system itself (e.g., through the re-definition of policies, creation of new policies (e.g., using button 331) among other examples, editing of policy attributes, etc.).

Figure 3F:
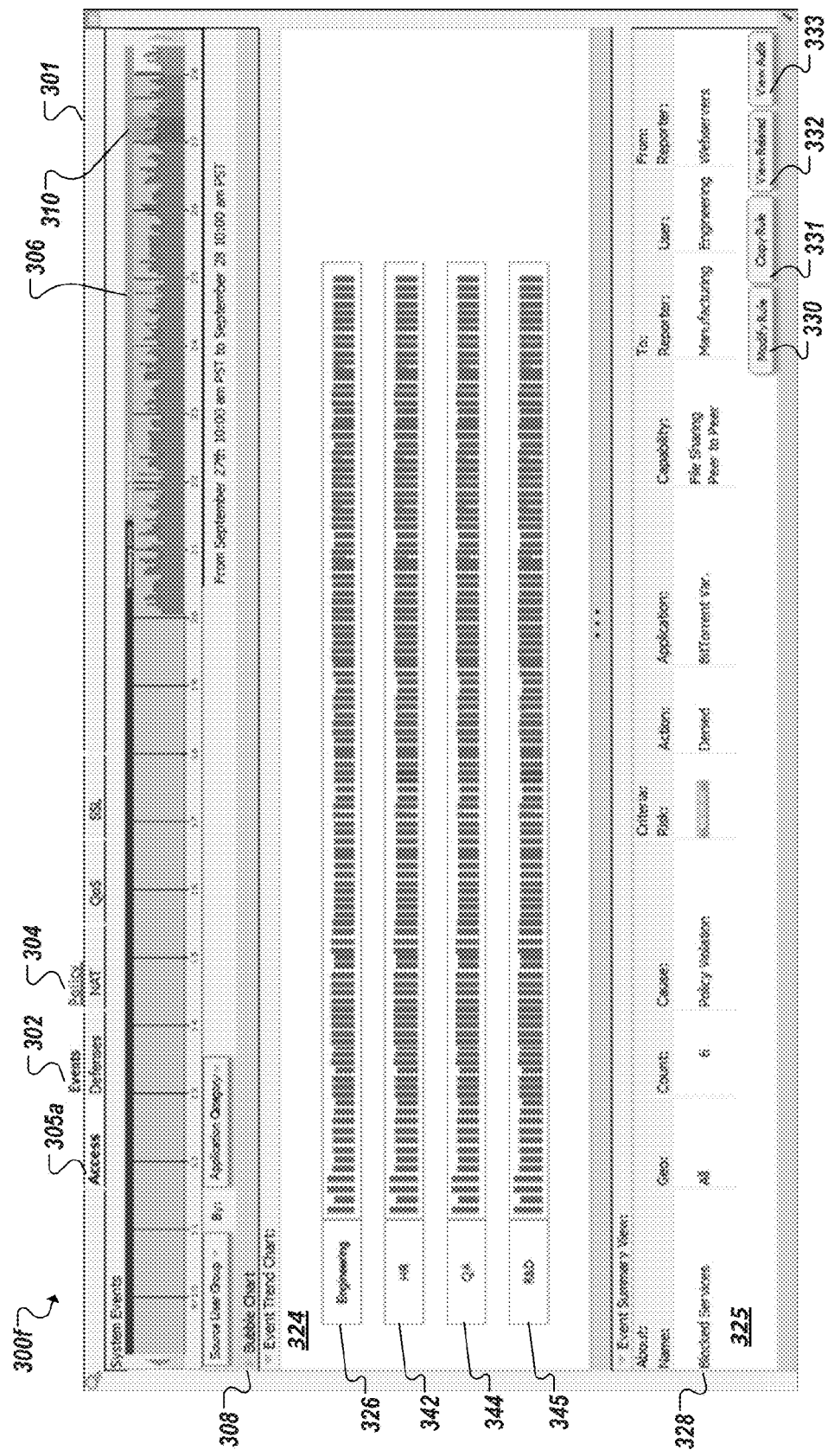

While some of the previous examples involve a user's interactions with a particular bubble-type data representation to further subsequent analytics tasks, other GUI windows and data representation types can be available to a user. Indeed, in some instances, a user can switch, replace, or otherwise change the type of a previously presented data representation, for instance, to analyze data from a new or otherwise different perspective. For instance, as shown in the example of FIG. 3F, a user can elect to minimize an initially presented bubble-type or other type of data representation (e.g., 308) and request or cause the generation of an alternate data representation from which to proceed and analyze security events (or policy). For example, in FIG. 3F, a user has collapsed a bubble chart representation 308 and replaced it with a listing of event trend chart data representations 326, 342, 344, 345. For example, a user can elect to display breakout event trend charts for each attribute value in a category of event attributes, such as a set of event trend charts (e.g., 326, 342, 344, 345) each corresponding to a separate system user group identified within a subset of security events. Indeed, a user can drive additional analyses, including analyses from the policy-centric context (e.g., through window 328) by instead interacting with or selecting GUI elements of alternate data representations (e.g., 326, 342, 344, 345), as shown in FIG. 3F.

In some instances, a user may desire to begin or initially focus their system security analytics workflow from a policy-centric context rather than an event-centric context, such as in the examples of FIGS. 3A-3F. Turning to FIG. 3G, a policy-centric GUI window 346 is shown in GUI 301, for instance, in connection with a user's selection of Policy tab 304. In this particular example, a listing of a subset of system security policies (e.g., 347-354) is shown in tabular form. For example, a user can select a subset of system security policies pertaining to a particular system security tool, such as deployed network firewalls, and select categories of security tool functionality, such as through Access tab 305b, to filter the set of system security policies for presentation in a policy-centric context of GUI 301. The example GUI window 346 can present details and attributes of the selected subset of policies (e.g., 347-354). In some instances, the attributes included in table 346 can be the same as or similar to the table of policies displayed in connection with the filtering of security events in GUI representations and windows within an event-centric context (e.g., as shown data representation 325 in the examples of FIGS. 3B-3F). Further, policy-centric controls (e.g., in row 355) can be provided in GUI window 346. Such controls 355 can be used, for instance, to trigger the creation of new policies, edit existing policies, delete existing policies, duplicate existing policies, among other examples, as well as launch GUI windows and data representations adapted to assist the user in performing such operations.

Figure 3H:
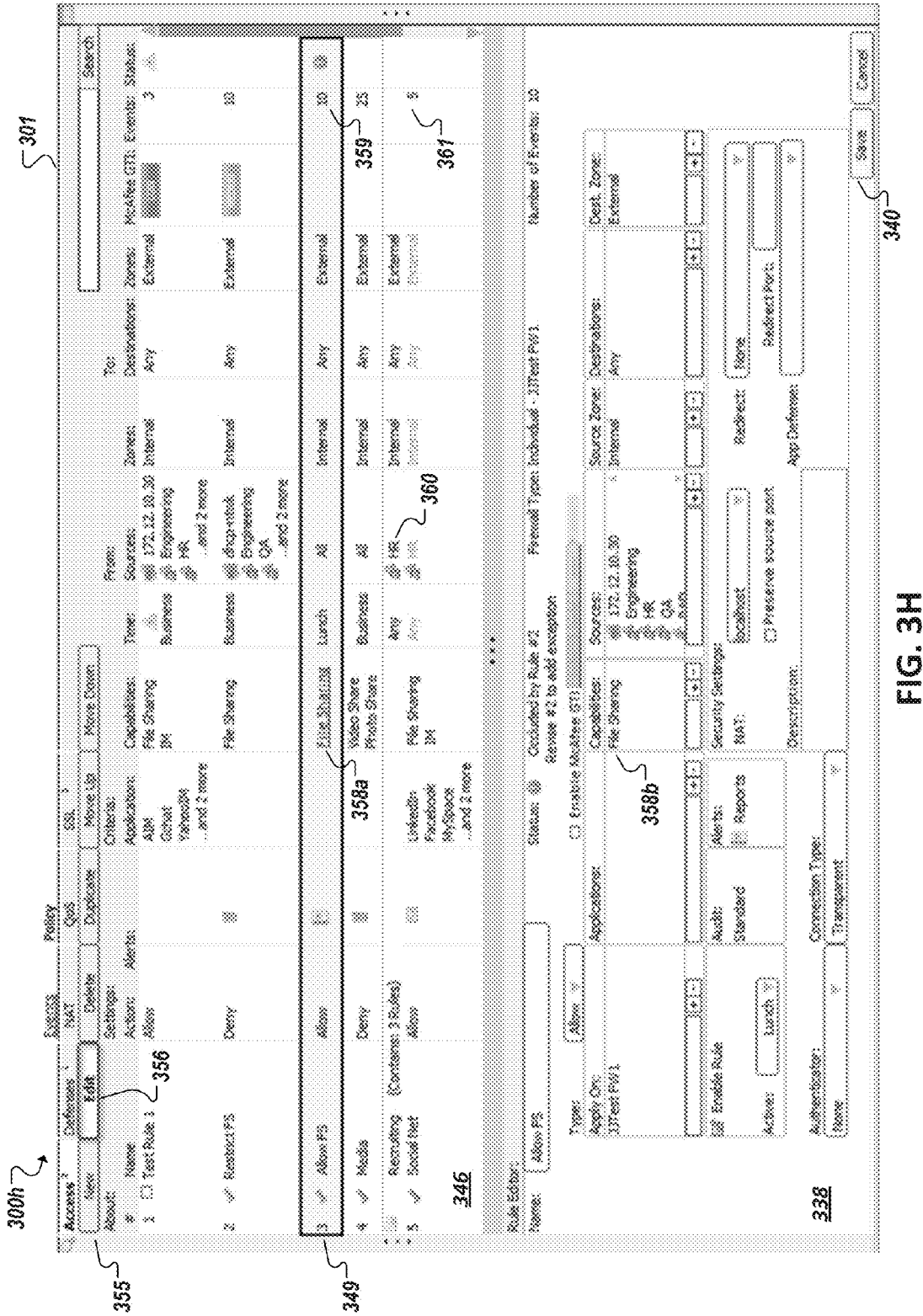

In one example, illustrated in FIG. 3H, a user can select one of the displayed policies (e.g., 349) in GUI window 346 and request (e.g., via control 356) to edit the corresponding policy. As with policy editing in connection with event-centric analyses (e.g., as shown and described in FIG. 3E), a policy editing GUI window 338 can be presented to the user in connection with the user's interactions with policy-centric context window 346. Further, as in the example of FIG. 3E, a user, beginning with a policy-centric GUI, can culminate an analytics workflow by creating or editing policies and applying the changed policies to live deployments of security tools in a system (e.g., through control 340).

Further, as in the event-centric examples of FIGS. 3A-3D, 3F, a user can perform policy-centric analytics using policy-centric GUI windows of GUI 301. For example, a user can interact with GUI elements (e.g., 358a, 358b, 360, among others) of GUI windows 346, 348 to filter, narrow, broaden, supplement, and otherwise modify the set of policy records considered and used as the basis of GUI windows included in GUI 301. For instance, a user can select one or more of the cells (e.g., 358a, 35b, 360) included in GUI tables or listings of windows 346, 348 to cause the set of policies displayed to be filtered, for instance, to display only those policies that include corresponding attributes. As an example, a user could select GUI element 360 to request a subset of security policies to be filtered to only include security policies that apply to a human resources (HR) user group. Further, event-centric GUI representations (e.g., 306, 308, 324) can be launched from a policy-centric GUI window (e.g., 346), for instance, by selecting graphical representations of events (e.g., event count elements 359, 361) related to a displayed policy.

In some implementations, attributes of policies and events represented in GUI 301 can be based on, linked to, or be otherwise associated with or incorporate system data objects describing or defining the respective attributes. For example, capabilities of a security tool (e.g., at 358a, 358b), or a user group (e.g., 360) to which a policy applies, among other system attributes, can be based on corresponding data objects of a capabilities class, each data object identifying attributes, methods, and other characteristics underlying and providing context for the capability (and thereby the policy itself). Indeed, in certain instances, definition of a policy (or detection of events and event attributes) can involve inheritance or calling of data and methods of underlying data objects defining attributes of the respective policy (e.g., data objects of a capabilities class). For instance, user group system objects can include a class of objects, including an HR object, an Engineering object, a quality assurance (QA) group object, among others, each object identifying, among other information, identities of individual users, associated machines, networks, and subsystems utilized in connection with the corresponding user group. Further, in some instances, in order to provide user administrators with even more granular control over policy definition and editing, GUI 301 can provide the user with an interface for use in editing underlying system objects relating to one or particular policies.

Figure 3I:
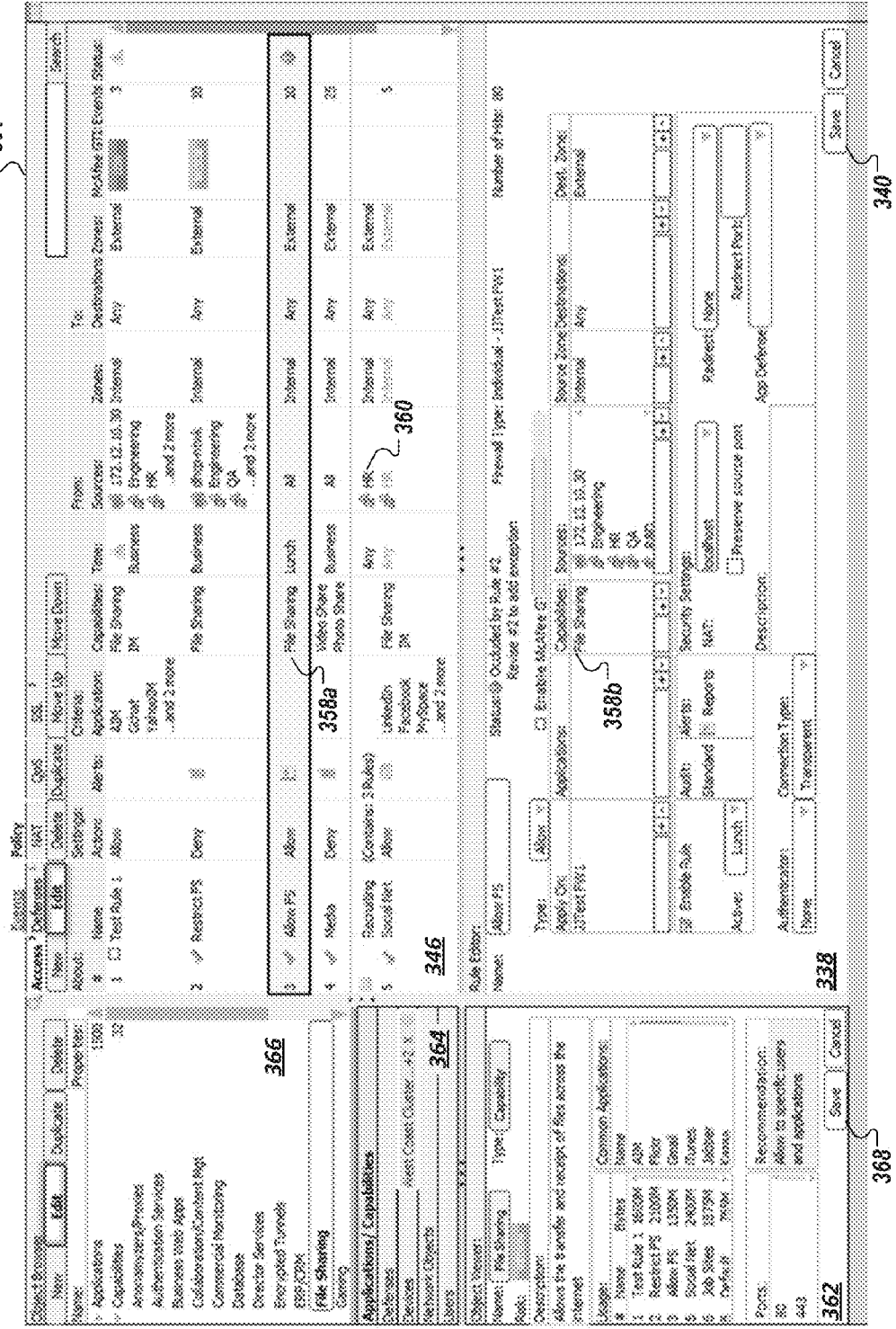

Turning to FIG. 3I, a screenshot 300i is shown of GUI 301 displaying additional windows 362, 364, 366 relating to the inspection and/or editing of system data objects involved in a security policy definition (or even identified as associated with one or more detected security events). For example, in FIG. 3I, a user has selected one of the GUI elements (e.g., selectable table cells 358a, 358b), corresponding to a File Sharing capability object to launch one or more GUI windows (e.g., 362, 364, 366) relating to one or more system data objects corresponding to the GUI element.

For instance, in the particular example of FIG. 3I, an object viewer window 362 can be presented that allows a user, within GUI 301, to inspect details of a particular object (e.g., the File Sharing object). A user, after inspecting details of one or more security events or security policies may have detected an issue that relates to an attribute of the events or policies with a corresponding data object. Accordingly, a user can inspect, and edit details of a corresponding object through a GUI window 362 in connection with maintenance or management of a security system. Additional object-related GUI windows 364 provide views into additional object attributes as well as listings of other objects and categories of objects, and provide the ability for the user to perform other object-related tasks, such as the creation of a new object to associate with a particular policy or event, embed within another objects, and so forth.

In the example of FIG. 3I, through object viewer window 362 a user can define and redefine such object attributes as the name of the object, type or class of object, an associated criticality of the object, a description of the object, attributes of the object (such as usage characteristics, applications grouped within the application category, associated ports, among other attributes of application category (or capability) objects), among other details. The class or type of object can control which attributes are defined (and editable) in an object. To illustrate, in another example, system objects can include user objects (e.g., used in association with security events (i.e., to identify users affected or associated with a detected event), or for reference in other objects such as user group objects). Each user object in the class may describe one of a plurality of individual system users and include such attributes (for inspection and editing) as the user's name, office location, contact information, demographic information, associated computing devices and networks, system permissions, authentication information (e.g., personal system password data), among other examples. Objects can be used and referenced, not only in the generation of GUI representations (e.g., within a GUI 301) but also in the assessment of a system itself, such as through the identification of security events in connection with one or more security tools. For instance, a violation of a policy by a particular user can include a call to an associated user object, capability object, or other object to assess whether the user has permission to access a particular system resource, among other examples.

FIGS. 4A-4B are simplified flowcharts 400*a*, 400*b* illustrating example techniques for integrating management of security events and security policies. For example, in FIG. 4A, a plurality of security events can be identified 405 within a system, such as security events that have been, or are being detected by one or more security tools deployed within a system. A GUI presentation, such as a GUI associated with a security tool management or analytics application, can be generated 410 to include a graphical representation of the identified security events and related data. The graphical representation of security events can include one or more infographics, graphical elements, and other data representations describing attributes of the identified security events. The graphical representations can be from a security event-centric context. Further, certain elements of the graphical representations can be interactive, permitting a user to select the elements of the graphical representations to launch corresponding views, additional graphical presentations, and operations. For example, one or more security events can be identified or selected 415 by a user through a detected user interaction with the graphical representation. Further, a subset of security policies, within a plurality of security policies defined for a system, can be identified 420 as associated with the one or more selected security events. An associated graphical representation of the identified subset of security policies can also be generated 425 and included within (or integrated in) the GUI presentation that includes a graphical representation of the identified security policies.

Managing and visualizing relationships between security events and policies can also be driven from a policy-centric context. For example, as shown in the example of FIG. 4B, a plurality of security policies can be identified 430 and GUI presentation generated 435 that includes a policy-centric graphical representation of the policies. (In some instances, the identified security policies and graphical representations can correspond to the identified (e.g., 420) subset of security policies and generated (e.g., 425) graphical representation, as well as from interactions with an event-centric context, as in the example of FIG. 4A). A user can interact with the graphical representations, for instance, to identify (e.g., at 440) a subset of one or more policies represented in the GUI presentation. Such user interactions can serve to identify 445 a subset of detected security events corresponding to (e.g., triggered by violations of or in connection with) the one or more policies. Further, a graphical representation of the identified security events can be generated 450 (and integrated with the generated GUI presentation) to reflect and represent the security events. Further user interactions can be received (e.g., leading to work flows similar to that described in connection with either FIG. 4A or 4B) via a GUI presentation including related event-centric and policy-centric graphical representations. Indeed, attributes of the policies definitions, events, and associated system data objects can be edited and modified via controls and GUI tools presented through the GUI presentation.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

One or more data structures can be utilized by software applications and programs described herein, including databases and data objects. Data objects are data entities including one or more defined or inherited attributes and values that can be operated upon by software functions, operations, applications, modules, and other software entities, such as software application and services. In some instances, attributes can be implemented as object metadata. Further, each object attribute can have associated data defining the values of the corresponding object attribute.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
    identify a plurality of security events detected in a computing system, each security event in the plurality of security events based on at least one policy in a plurality of security policies defined for the computing system;
    present a first representation of the plurality of security events in an interactive graphical user interface, wherein the first representation of the plurality of security events includes a plurality of selectable event elements, each event element representing at least one security event in the plurality of security events;
    receive, via the interactive graphical user interface, a user selection of a particular event element presented in the first representation;
    identify a subset of the plurality of security policies, each security policy in the subset serving as a basis for at least one particular security event represented by the particular event element; and
    present, in the interactive graphical user interface, based on the user selection, a listing of the subset of security policies based on the user selection of the particular event element.

2. The storage medium of claim 1, wherein the plurality of security events are provided by at least one security tool adapted to detect security events in a computing system.

3. The storage medium of claim 2, wherein the at least one security tool is a firewall.

4. The storage medium of claim 1, wherein the particular event element represents at least two particular security events and the subset of security policies includes all security policies serving as a basis for any one of the at least two particular security events.

5. The storage medium of claim 4, wherein the subset of security policies includes at least two security policies.

6. The storage medium of claim 1, wherein the at least one particular security event was triggered in response to a detected violation of at least one of the subset of security policies.

7. The storage medium of claim 1, wherein selection of the particular event element causes a window to be displayed including a view of attributes of the at least one particular security event.

8. The storage medium of claim 1, wherein the instructions, when executed, further cause the machine to receive, via the interactive graphical user interface, a user selection of a particular security policy presented in the listing of the subset of security policies.

9. The storage medium of claim 8, wherein selection of the particular security policy presented in the listing causes a window to be displayed including a view of attributes of the particular security policy.

10. The storage medium of claim 8, wherein the instructions, when executed, further cause the machine to:
receive user inputs, via the window, indicating a modification to the particular security policy; and
modify the particular security policy in accordance with the indicated modification.

11. The storage medium of claim 1, wherein the instructions, when executed, further cause the machine to:
receive a request to edit a particular one of the subset of security policies; and
modify the particular security policy in accordance with user inputs received via the interactive graphical user interface.

12. The storage medium of claim 11, wherein a security tool applies the modified particular security policy to monitoring of a computing system.

13. The storage medium of claim 12, wherein applying the modified particular security policy to monitoring of the computing system includes:
identifying a violation, during the monitoring, of the modified particular security policy;
generating a particular security event based on the violation; and
providing data for use in a representation of the particular security event in the interactive user interface.

14. The storage medium of claim 1, wherein an attribute of at least the particular security event or the subset of security policies is defined in a particular corresponding data object, in a plurality of data objects of the computing system.

15. The storage medium of claim 14, wherein the first representation includes a graphical representation of data in the particular data object representing attributes of the at least one particular security event.

16. The storage medium of claim 15, wherein the graphical representation of the data in the particular data object includes a selectable object element and selection of the selectable object element in the graphical representation of the particular data object causes an object view window to be presented in the interactive user interface presenting a view of the particular object.

17. The storage medium of claim 16, wherein the instructions, when executed, further cause the machine to:
receive user inputs, via the object view window, indicating a modification to the particular data object; and
modify the particular data object in accordance with the indicated modification, wherein modification to the particular data object affects subsequent security tasks performed by one or more security tools using the particular data object.

18. The storage medium of claim 1, wherein the first representation includes a bubble representation including a plurality of graphical bubble elements, each graphical bubble element is a selectable event element, and each graphical bubble element represents a corresponding amount of events detected for a corresponding intersection of two respective event attributes.

19. The storage medium of claim 1, wherein the first representation includes an event trend chart representation including a plurality of chronological trend line elements, each chronological trend line element is a selectable event element, and each chronological trend line element represents security events in the plurality of security events detected within a corresponding time period.

20. A method comprising:
identifying a plurality of security events detected in a computing system, each security event in the plurality of security events based on at least one policy in a plurality of security policies defined for the computing system;
presenting a first representation of the plurality of security events in an interactive graphical user interface, wherein the first representation of the plurality of security events includes a plurality of selectable event elements, each event element representing at least one security event in the plurality of security events;
receiving, via the interactive graphical user interface, a user selection of a particular event element presented in the first representation;
identifying a subset of the plurality of security policies, each security policy in the subset serving as a basis for at least one particular security event represented by the particular event element; and
presenting, in the interactive graphical user interface, based on the user selection, a listing of the subset of security policies based on the user selection of the particular event element.

21. A system comprising:
at least one processor device;
at least one memory element; and
a security event user interface engine, comprising logic when executed by the at least one processor device to:
identify a plurality of security events detected in a computing system, each security event in the plurality of security events based on at least one policy in a plurality of security policies defined for the computing system;
present a first representation of at least a portion of the plurality of security policies in an interactive graphical user interface, wherein the first representation of the portion of security policies includes a plurality of selectable policy elements, each policy element representing at least one security policy in the plurality of security policies;
receive, via the interactive graphical user interface, a user selection of a particular policy element presented in the first representation;
identify a subset of the plurality of security events, each security event in the subset based at least in part on at least one particular security policy represented by the particular policy element; and present, in the interactive graphical user interface, based on the user selection, a listing of the subset of the plurality of security events based on the user selection of the particular policy element.

* * * * *